(12) United States Patent
Dan

(10) Patent No.: US 11,755,848 B1
(45) Date of Patent: Sep. 12, 2023

(54) PROCESSING STRUCTURED AND UNSTRUCTURED TEXT TO IDENTIFY SENSITIVE INFORMATION

(71) Applicant: Wells Fargo Bank, N.A., San Francisco, CA (US)

(72) Inventor: Arnab Dan, Naperville, IL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 488 days.

(21) Appl. No.: 16/874,385

(22) Filed: May 14, 2020

(51) Int. Cl.
| | |
|---|---|
| *G06F 40/166* | (2020.01) |
| *G06F 40/56* | (2020.01) |
| *G06N 20/00* | (2019.01) |
| *G06F 21/62* | (2013.01) |
| *G06F 40/295* | (2020.01) |
| *G06F 16/9032* | (2019.01) |

(Continued)

(52) U.S. Cl.
CPC ........ *G06F 40/56* (2020.01); *G06F 16/90332* (2019.01); *G06F 18/2155* (2023.01); *G06F 21/6245* (2013.01); *G06F 40/295* (2020.01); *G06F 40/30* (2020.01); *G06N 20/00* (2019.01)

(58) Field of Classification Search
CPC .. G06F 21/6254; G06F 16/3329; G06F 40/30; G06F 21/6245; G06F 40/279; G06F 40/205; G06F 40/20; G06F 21/6227; G06F 40/284; G06N 20/00; G06N 3/08; G06N 5/04; G06N 7/023; G06N 5/022; G06N 3/02; G06N 5/003

See application file for complete search history.

(56) References Cited

U.S. PATENT DOCUMENTS

| | | | |
|---|---|---|---|
| 10,043,035 B2 | 8/2018 | LaFever et al. | |
| 10,169,315 B1 * | 1/2019 | Heckel | G06F 21/60 |
| 10,878,181 B2 * | 12/2020 | Heckel | G06F 40/166 |

(Continued)

FOREIGN PATENT DOCUMENTS

WO 2019086553 A1 5/2019

OTHER PUBLICATIONS

Aberdeen et al., "The MITRE Identification Scrubber Toolkit: Design, training, and assessment," International Journal of Medical Informatics, Sep. 10, 2010, Elsevier, 11 pp.

(Continued)

*Primary Examiner* — Olujimi A Adesanya
(74) *Attorney, Agent, or Firm* — Shumaker & Sieffert, P.A.

(57) ABSTRACT

This disclosure describes techniques that include identifying sensitive information from any appropriate set of data, such as data produced by operations of a business or organization. In one example, this disclosure describes a method that includes receiving text data containing sensitive information, including structured sensitive information and unstructured sensitive information; applying a rule-based model to identify the structured sensitive information in the text data; applying a machine learning model to identify the unstructured sensitive information in the text data, wherein the machine learning model has been trained to identify unstructured sensitive information in text; and generating output text data from the text data by modifying the structured sensitive information identified by the rule-based model and the unstructured sensitive information identified by the machine learning model.

10 Claims, 6 Drawing Sheets

(51) Int. Cl.
  *G06F 40/30* (2020.01)
  *G06F 18/214* (2023.01)

(56) References Cited

U.S. PATENT DOCUMENTS

| | | | | |
|---|---|---|---|---|
| 11,144,331 | B1* | 10/2021 | Kushner | G06F 9/453 |
| 11,386,259 | B2* | 7/2022 | Heckel | G06N 3/045 |
| 11,431,493 | B1 | 8/2022 | Lewi et al. | |
| 2006/0075228 | A1* | 4/2006 | Black | H04L 63/104 |
| | | | | 713/167 |
| 2012/0150773 | A1* | 6/2012 | DiCorpo | G06N 20/00 |
| | | | | 706/12 |
| 2012/0303558 | A1* | 11/2012 | Jaiswal | G06N 20/00 |
| | | | | 706/12 |
| 2013/0332194 | A1* | 12/2013 | D'Auria | G16H 10/60 |
| | | | | 705/3 |
| 2014/0195429 | A1 | 7/2014 | Paulsen | |
| 2018/0005626 | A1* | 1/2018 | Betley | G10L 15/063 |
| 2018/0285599 | A1* | 10/2018 | Praveen | G06K 9/00523 |
| 2019/0163928 | A1* | 5/2019 | Hankeln | G06F 16/11 |
| 2019/0332658 | A1* | 10/2019 | Heckel | G06N 3/0481 |
| 2019/0377900 | A1 | 12/2019 | Balzer et al. | |
| 2020/0081978 | A1* | 3/2020 | Ahmed | G06F 40/279 |
| 2020/0082214 | A1* | 3/2020 | Salammagari | G06N 3/006 |
| 2020/0342032 | A1* | 10/2020 | Subramaniam | G10L 15/063 |
| 2020/0349271 | A1* | 11/2020 | Binkley | G06F 16/353 |
| 2021/0056099 | A1* | 2/2021 | Goodsitt | G06F 16/35 |
| 2021/0065053 | A1* | 3/2021 | Higgins | G06N 20/20 |
| 2021/0224415 | A1 | 7/2021 | Qi et al. | |
| 2021/0303724 | A1* | 9/2021 | Goshen | G10L 15/063 |

OTHER PUBLICATIONS

Gershgorn, "Artificial intelligence can scour code to find accidentally public passwords," Quartz, Apr. 18, 2018, 3 pp.

Meldau, "Deep Neural Networks for Inverse De-Identification of Medical Case Narratives in Reports of Suspected Adverse Drug Reactions," Degree Project in Computer Science and Engineering, Second Cycle, KTH Royal Institute of Technology, Feb. 24, 2018, 114 pp.

Office Action from U.S. Appl. No. 17/457,384 dated Feb. 2, 2023, 17 pp.

* cited by examiner

PROCESSING STRUCTURED AND UNSTRUCTURED TEXT TO IDENTIFY SENSITIVE INFORMATION

TECHNICAL FIELD

This disclosure relates to text processing, and more specifically, to processing of text to identify sensitive information.

BACKGROUND

Businesses and other organizations increasingly use data collected from operations or business transactions for analytics and other purposes. In some cases, such data may be used to improve or scrutinize business processes, for training, or for data mining. The data may be generated from or derived from chatbot transcripts, emails, and other communications. Such data often includes sensitive information, such as data about customer transactions and personal data about customers and other transaction participants. While some of this sensitive information occurs within the data in a consistent format (e.g. phone numbers), some of the data includes sensitive information having inconsistent and/or varying formats across records and databases (e.g., names, addresses, descriptions of interactions).

SUMMARY

This disclosure describes techniques that include identifying sensitive information occurring within any appropriate set of data, such as text data produced by operations of a business or organization. Once identified, sensitive information occurring in the text can be processed to remove or mask the sensitive information, making the data appropriate for other uses, such as downstream analytics, business modeling and analysis, training of personnel, training of machine learning models, disclosure to and use by third parties, and other purposes.

Techniques described herein include processing data (e.g., enterprise data) using both a rule-based scrubbing process and an artificially intelligent (AI) natural language-based scrubbing process. Techniques are described in which the rule-base process and the AI natural language-based process operate on the data cooperatively, so that the processes work together to effectively identify sensitive information and remove it so that the data can be used for other purposes. In some examples, the rule-based process may be implemented, at least in part, through regular-expression processing to identify sensitive information that tends to exist in the data in a structured or regular form. In some examples, the AI and/or natural language-based process may be implemented, at least in part, through a machine learning algorithm trained to identify sensitive information that might exist in the data in an inconsistent or unpredictable form. In some examples, using both types of processes may enable effective identification of sensitive information, and thereby enable further use of the data without improper use or disclosure of sensitive information.

The techniques described herein may provide certain technical advantages. For instance, a scrubbing process that operates using both rules-based and AI natural language-based processes may provide a more consistent, unified, and efficient solution to scrubbing data that can be used across an enterprise or organization. Such a solution may, in some examples, execute as an automatic step in a larger data aggregation process to minimize disruption to workflow processes.

Further, by using both rules-based and AI natural language-based processes, parsing of sensitive data may be faster and more accurate, particularly if the order of the processes is optimized. In some cases, for example, an artificially intelligent natural language process that operates to identify and scrub sensitive unstructured data in text that has already been scrubbed for structured sensitive data may operate more quickly, efficiently, and accurately than processes that operate independently to scrub structured and unstructured sensitive data.

In some examples, this disclosure describes operations performed by a computing system in accordance with one or more aspects of this disclosure. In one specific example, this disclosure describes a method comprising receiving, by a computing system, text data containing sensitive information, including structured sensitive information and unstructured sensitive information; applying, by the computing system, a rule-based model to identify the structured sensitive information in the text data; applying, by the computing system, a machine learning model to identify the unstructured sensitive information in the text data, wherein the machine learning model has been trained to identify unstructured sensitive information in text; and generating, by the computing system, output text data from the text data by modifying the structured sensitive information identified by the rule-based model and the unstructured sensitive information identified by the machine learning model.

In another example, this disclosure describes a computing system having a storage system and processing circuitry, wherein the processing circuitry has access to the storage system and is configured to perform operations comprising: receiving text data containing sensitive information, including structured sensitive information and unstructured sensitive information; applying a rule-based model to identify the structured sensitive information in the text data; applying a machine learning model to identify the unstructured sensitive information in the text data, wherein the machine learning model has been trained to identify unstructured sensitive information in text; and generating output text data from the text data by modifying the structured sensitive information identified by the rule-based model and the unstructured sensitive information identified by the machine learning model.

In another example, this disclosure describes a non-transitory computer-readable medium comprising instructions for causing processing circuitry to perform operations comprising: receiving text data containing sensitive information, including structured sensitive information and unstructured sensitive information; applying a rule-based model to identify the structured sensitive information in the text data; applying a machine learning model to identify the unstructured sensitive information in the text data, wherein the machine learning model has been trained to identify unstructured sensitive information in text; and generating output text data from the text data by modifying the structured sensitive information identified by the rule-based model and the unstructured sensitive information identified by the machine learning model.

The details of one or more examples of the disclosure are set forth in the accompanying drawings and the description herein. Other features, objects, and advantages of the disclosure will be apparent from the description and drawings, and from the claims.

DETAILED DESCRIPTION

Figure 1A:
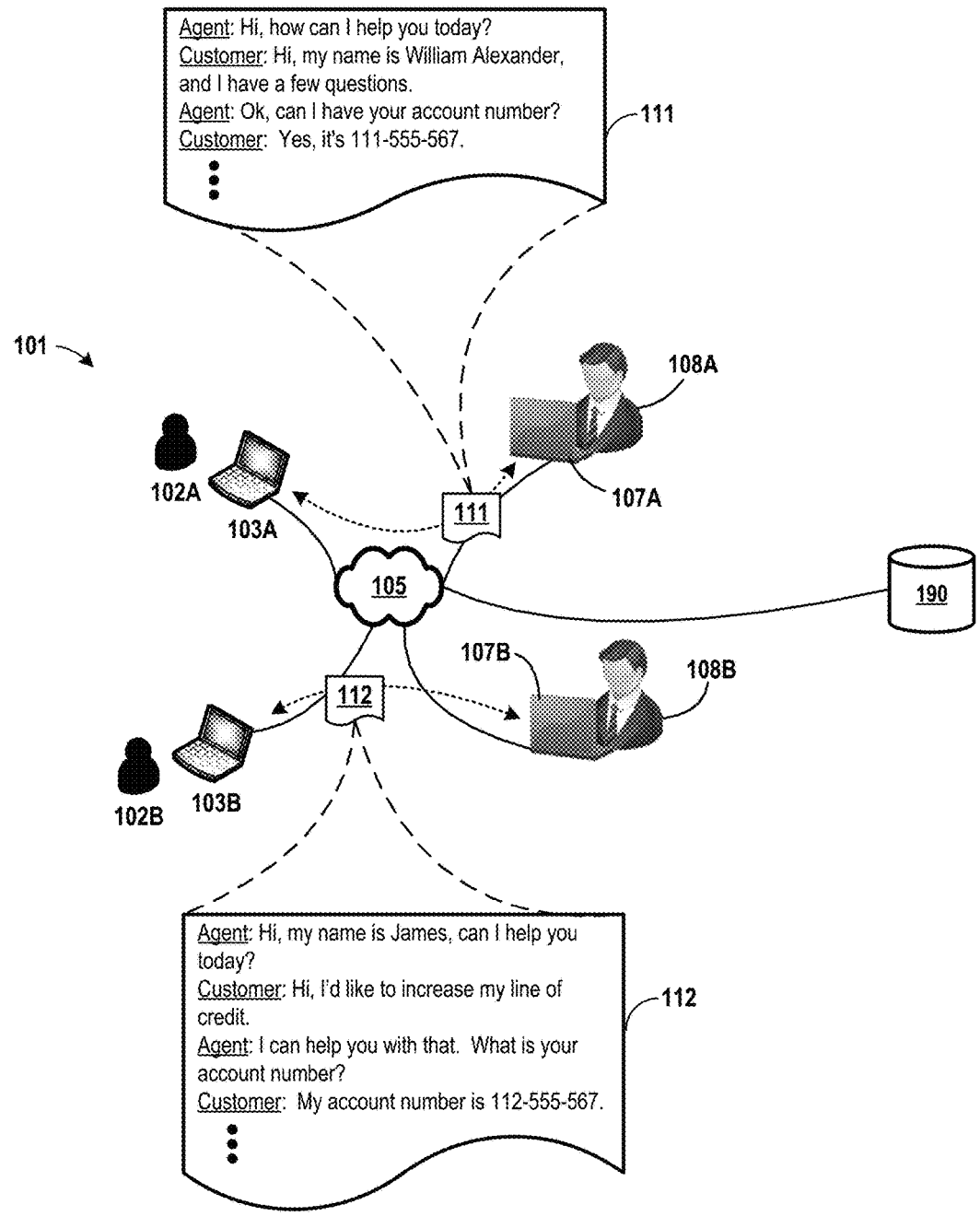
FIG. 1A is a conceptual diagram illustrating an example communication system, in accordance with one or more aspects of the present disclosure.

FIG. 1A is a conceptual diagram illustrating an example communication system, in accordance with one or more aspects of the present disclosure. The example of FIG. 1A illustrates communications system 101 in which network 105 connects a number of computing devices, including computing device 103A and computing device 103B ("computing devices 103") and computing device 107A and computing device 107B ("computing devices 107"). Computing device 103A is shown operated by user 102A, computing device 103B is operated by user 102B, computing device 107A is operated by agent 108A, and computing device 107B is operated by agent 108B. For ease of illustration, a limited number of computing devices 103 and computing devices 107 are shown in FIG. 1A. However, any number of computing devices 103 and computing devices 107, operated by any number of users 102 and/or agents 108, are contemplated by this disclosure.

FIG. 1A may represent a system in which users or customers may engage in communications with agents of a business or organization. For instance, in one example, communications system 101 may be used or operated by a business, such as a bank, to provide customer service or other services to its account holders, prospective account holders, or other individuals. Typically, each of users 102 may, through one of computing devices 103, initiate communication with one or more of agents 108 of the bank operating one of computing devices 107. Users 102, who may be customers of such a bank, communicate with one or more of agents 108 to request a service, report an issue, engage in a transaction, ask a question, or to perform another task. Communications between users 102 and agents 108 may take any appropriate form, including text chat, SMS chats, audio, video, picture or video messaging, email, customer service ticketing communications, or other forms.

Communications between users 102 and agents 108 may be logged, recorded, or otherwise memorialized. In the example of FIG. 1A, communications between users 102 and agents 108 may take the form of text chat, with transcriptions of chats between users 102 and agents 108 shown as transcript 111 and transcript 112. Specifically, the chat taking place between user 102A and agent 108A is represented by transcript 111, and the chat taking place between user 102B and agent 108B is represented by transcript 112. Each of transcripts 111 and 112 are stored in data repository 190, typically after the chat has been completed. In some examples, regulatory requirements, industry guidelines, risk management practices, or compliance considerations may encourage or mandate storage of recordings of communications between users 102 and agents 108.

Over the course of time, many communications may take place between agents 108 and users 102, and thus a significant number of transcriptions of those communications may eventually be stored within data repository 190. When data repository 190 accumulates a large number of interactions taking place within communications system 101, the data within data repository 190 may represent a significant store of information that can be used for productive purposes. For instance, a business or organization may make the data stored within data repository 190 available in an enterprise data lake or in another form to enable the data to be used in performing analytics. Such analytics may provide insights about organizational or business operations and/or insights into customer requests, desires, problems, market trends, competitive information, or other topics. Data stored within data repository 190 may also be used for training new agents or for training other personnel. In some examples, data stored within data repository 190 may also be used as a source of training data for a chat bot or artificially intelligent agent trained to provide customer service in communications system 101 or in a system similar to communications system 101.

The data stored in data repository 190 may, however, include certain information that might not be appropriate for wide use or distribution outside an organization or even within an organization. For example, it might not be appropriate for a transcript that includes names, addresses, phone numbers, credit card numbers, account numbers, or other sensitive personal information to be used in a manner that may compromise the secrecy of such information and/or expose or reveal the sensitive information to people or systems not involved in the original communication. Such sensitive information can take many forms, and may include personally identifiable information (PII), such as consumer data that could be used to identify an individual or that could be used to gain access to an individual's accounts or other secure storage areas. Such sensitive information may also include information associated with the payment card industry data security standard (PCI DSS), which is an information security standard outlining compliance requires for treatment of data for organizations that handle credit cards. In some cases, laws, regulatory requirements, privacy acts, and/or compliance standards (e.g., PCI DSS) may mandate that data containing sensitive information be properly protected from inappropriate use, access, alternation, disclosure, or destruction.

Accordingly, before such data is used for other purposes, it may be appropriate and/or desirable to remove or otherwise treat the sensitive information within data (e.g., transcripts 111 and 112) that might be stored within data repository 190. If the data is appropriately scrubbed, it may be used for other purposes without compromising the privacy of the sensitive information contained within the data.

In the example illustrated in FIG. 1A, data included within transcripts 111 and 112 include various types of sensitive information or PII, such as names or account numbers. Other examples illustrated herein may include other forms of sensitive information, such as addresses, phone numbers, and other information. In some cases, the sensitive data follows a structured, regular, or predictable form, such as a phone number or social security number, or an account number having a known format. In other cases, however, the sensitive data might be unstructured, and not have a regular or predictable form. Examples of unstructured sensitive data may include names, addresses, organization names, partial social security numbers, or the like. Manual processing of the data is largely impractical due to the volume of the data. Automated processing of such unstructured data is also often difficult, due to the inconsistent format or structure of the sensitive information included within the data.

Figure 1B:
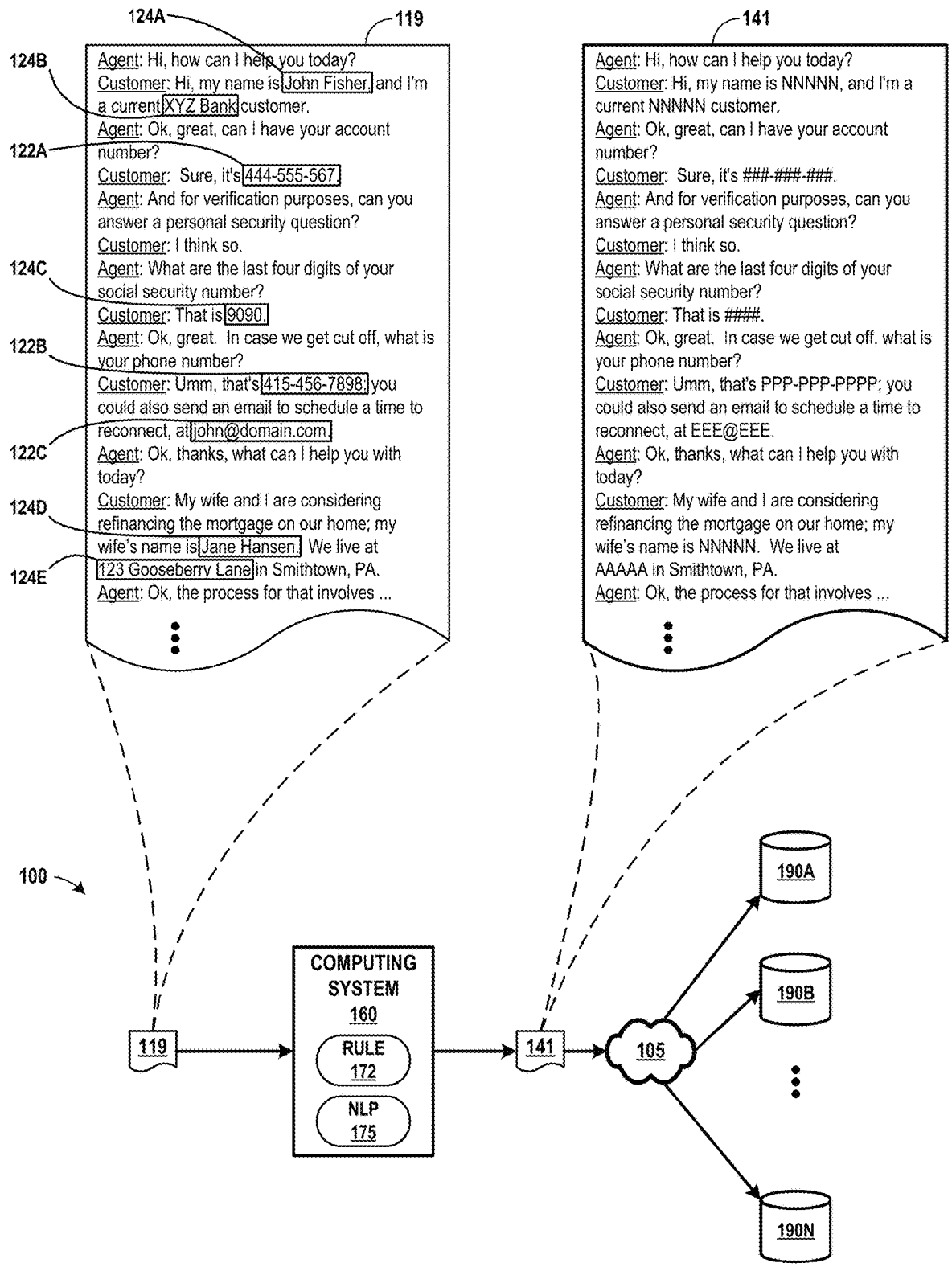
FIG. 1B is a conceptual diagram illustrating an example system for processing, cleaning, and/or scrubbing data to remove sensitive information, in accordance with one or more aspects of the present disclosure.

FIG. 1B is a conceptual diagram illustrating an example system for processing, cleaning, and/or scrubbing data to remove sensitive information, in accordance with one or more aspects of the present disclosure. The example of FIG. 1B illustrates system 100 in which unscrubbed transcript 119 is processed by computing system 160 to generate scrubbed transcript 141.

Unscrubbed transcript 119 may be a set of text data similar to transcript 111 or transcript 112 of FIG. 1A, and may include a variety of sensitive information. In some examples, unscrubbed transcript 119 may be a word-for-word reproduction of a text chat that took place or is taking place between one of users 102 (i.e., operating one of computing devices 103) and one or more of agents 108 (i.e., operating one of computing devices 107) of FIG. 1A. Once processed by computing system 160, scrubbed transcript 141 is transmitted over network 105 and stored at one or more of data repositories 190A through 190N (collectively "data repositories 190," and representing any number of data repositories). One or more of data repositories 190 illustrated in FIG. 1B may correspond to data repository 190 of FIG. 1A, and may represent an enterprise data lake or a data repository that may be used for business or organizational analytics, or for other purposes, which could include serving as a training set for human or machine learning.

Unscrubbed transcript 119 of FIG. 1B includes a number of instances of sensitive data. Such data includes names, addresses, account numbers, and other information. Specifically, in the example of FIG. 1B, unscrubbed transcript 119 includes instances of structured sensitive data 122A, 122B, and 122C (collectively, "structured sensitive data 122"). Unscrubbed transcript 119 also includes instances of unstructured sensitive data 124A, 124B, 124C, 124D, and 124E (collectively "unstructured sensitive data 124"). In some cases, privacy or other considerations may require that all instances of structured sensitive data 122 and all instances of unstructured sensitive data 124 be treated and/or scrubbed before being used for other purposes.

In the example of FIG. 1B, computing system 160 processes unscrubbed transcript 119 using both a rule-based model and an artificially intelligent natural language processing-based model to remove instances of sensitive data occurring within unscrubbed transcript 119. Specifically, a rule-based structured data scrubbing module ("rule") 172 of computing system 160 applies rules to identify, within the text included within unscrubbed transcript 119, each instance of structured sensitive data 122. In some examples, structured data scrubbing module 172 may employ regular expression ("regex") parsing techniques to identify sensitive information that has a consistent and/or regular form. As shown in FIG. 1B, structured sensitive data 122A corresponds to an account number, and to the extent that such an account number has a regular or known format, it can often be identified reliably using a rule-based parser or a regular expression-based search algorithm or parser. Similarly, structured sensitive data 122B corresponds to a phone number occurring within unscrubbed transcript 119. Structured sensitive data 122C, corresponding to an email address, typically has a regular or identifiable form, and can often be identified accurately using a rule-based parser.

To identify instances of unstructured sensitive data 124, a natural language processing (NLP)-based unstructured data scrubbing module ("NLP") 175 of computing system 160 applies NLP and, in some examples, artificial intelligence to identify, within the text included within unscrubbed transcript 119, each instance of unstructured sensitive data 124. In some examples, unstructured data scrubbing module 175 may represent or include a machine learning model trained to identify instances of unstructured sensitive data 124 within unscrubbed transcript 119 using the context of a line or sentence within unscrubbed transcript 119. In some examples, unstructured data scrubbing module 175 uses an artificially intelligent natural language probabilistic parser (e.g., a neural network) that identifies unstructured sensitive information using Conditional Random Field techniques.

As shown in FIG. 1B, unstructured sensitive data can take many forms. For example, unstructured sensitive data 124A and unstructured sensitive data 124D correspond to names of people, and unstructured sensitive data 124B is a name of an organization. Unstructured sensitive data 124C is a portion of a social security number, and unstructured sensitive data 124E is a street address. Each of these instances of unstructured sensitive data 124 typically lack a consistent or regular pattern, and a rules-based parser would often have difficulty reliably identifying each such instance of unstructured sensitive data 124.

A machine learning model, however, may be effectively trained to identify instances of unstructured sensitive data 124. To train such a model, computing system 160 (or another computing system) may collect a sufficiently large number of transcripts, such as transcript 111, transcript 112, and others in FIG. 1A, and label each instance of unstructured sensitive data 124 that occurs within each transcript. Computing system 160 (or another computing system) may train a machine learning model to use natural language processing (NLP) and/or probabilistic parsing techniques to make accurate predictions about the structure of messy, unstructured text.

In some examples, unstructured data scrubbing module 175 may employ Conditional Random Field modeling techniques to take context into account, which may involve a machine learning model that uses other words in the same line or within the same sentence to accurately identify unstructured sensitive data. For example, text derived from a chat between a customer and a customer service agent for a bank may provide useful contextual clues that are helpful in identifying unstructured sensitive information. For example, a street address may have a significant likelihood of occurring in a chat transcript near words that include an occurrence of a phone number. If a phone number is identified in a chat transcript, data scrubbing module 175 may use that fact to help identify a nearby occurrence of a street address. Accordingly, contextual information may enable some unstructured information to be accurately identified as sensitive (e.g., a name) or not sensitive (e.g., a generic name of a service or product or the first name of one of agents 108). Unstructured data scrubbing module 175 may derive such context from other words in a single line, or from other words in a single sentence or communication by a particular chat participant. In other cases, unstructured data scrubbing module 175 may derive such context from words used across multiple lines, sentences, paragraphs, responses, or other across multiple chat transcripts.

In FIG. 1B, and in accordance with one or more aspects of the present disclosure, system 100 may configure structured data scrubbing module 172 to identify instances of structured sensitive data 122. For instance, in an example that can be described with reference to FIG. 1B, computing system 160 detects input from an administrator or programmer (not shown). Computing system 160 may determine that the input corresponds to rules for identifying structured sensitive data 122 within text data sets. Computing system 160 configures structured data scrubbing module 172 to process any new transcripts (e.g., unscrubbed transcript 119) that may be presented to computing system 160 for processing of sensitive data.

In addition, system 100 may train unstructured data scrubbing module 175 to identify instances of unstructured sensitive data 124. For instance, continuing with the example being described with reference to FIG. 1B, computing system 160 receives a collection of transcripts (not shown in FIG. 1B) from one or more communication systems, such as transcripts (e.g., transcripts 111 and 112) generated by communications system 101 of FIG. 1A. In some examples, the transcripts received by computing system 160 are labeled to identify instances of unstructured sensitive data 124. Such labeling may be performed at least partially by hand or manually, by humans. In other examples, however, such labeling may be performed in an automated or partially automated way. Computing system 160 uses the collection of transcripts as a training set to train a machine learning model (e.g., included within unstructured data scrubbing module 175) to identify instances of unstructured sensitive data 124 in any new transcripts (e.g., unscrubbed transcript 119) that are presented to computing system 160.

Although in some examples computing system 160 may train the machine learning model, in other examples, a different computing system (or set of computing systems) may be used to train the machine learning module to process unscrubbed transcripts. Such computing systems may also update and revise the machine learning module based on how the model performs when applied to verification data, or based on how the model performs over time when presented with new transcripts during production. In such an example, therefore, computing system 160 might not train the machine learning model, but instead, may simply apply the trained model to new transcripts (e.g., unscrubbed transcript 119) received by computing system 160.

System 100 may process unscrubbed transcript 119 to remove sensitive data. For instance, still continuing with the example being described with reference to FIG. 1B, computing system 160 detects input that it determines corresponds to unscrubbed transcript 119. Computing system 160 applies structured data scrubbing module 172 to identify instances of structured sensitive data 122 within unscrubbed transcript 119. Computing system 160 applies unstructured data scrubbing module 175 to identify instances of unstructured sensitive data 124 within unscrubbed transcript 119. Computing system 160 modifies unscrubbed transcript 119 to remove each identified instance of structured sensitive data 122 and unstructured sensitive data 124. Computing system 160 generates scrubbed transcript 141 as illustrated in FIG. 1B.

As shown in FIG. 1B, names of people and organizations are replaced with "NNNNN," account numbers and other numerical fields are replaced with "###," phone numbers are replaced with "PPP-PPP-PPPP," email addresses are replaced with "EEE@EEE," and addresses are replaced with "AAAAA." In some examples, each instance of structured sensitive data 122 and unstructured sensitive data 124 may be replaced by the same string of text (e.g., "XXX"). However, replacing text using different coded strings of text, as in FIG. 1B, removes the sensitive information included within unscrubbed transcript 119, but also leaves or retains an indication of the type of data that was removed. An indication of the type of information that was removed may be appropriate for some analytical applications and for other uses.

System 100 may store scrubbed transcript 141 for later use. For instance, again continuing with the example being described, computing system 160 outputs scrubbed transcript 141 over network 105. One or more of data repositories 190 receive scrubbed transcript 141 and store scrubbed transcript 141. Each such data repository 190 thereafter makes scrubbed transcript 141 available for use in other applications that process text transcripts derived from communications system 101 of FIG. 1A.

The techniques described herein may provide certain technical advantages. For instance, some organizations have multiple disparate teams that develop solutions to remove specific types of unstructured sensitive data from data sources. A unified organizational or enterprise tool that uses NLP capabilities to remove a wide range of sensitive information from a variety of data sources, however, may be a more consistent and efficient approach to addressing use of data that includes sensitive data. Such an approach may execute as an automatic step in a larger data aggregation process to minimize disruption to workflow processes, and as a result, may reduce or minimize the risk of sensitive information infiltrating any downstream analytics processes. Further, removing sensitive data may facilitate retention of the original records (with sensitive data replaced with placeholder data), thereby reducing or eliminating the risk associated with using sensitive information improperly.

Still further, by using both a rules-based algorithm and an artificial intelligence algorithm (e.g., based on NLP techniques), parsing of sensitive data may be faster and more accurate. One reason such a solution may be faster and more accurate is that each algorithm may be tuned to its respective strength (rules-based algorithm for structured data, machine learning algorithm for unstructured data). In addition, by using two (or more) distinct techniques for identifying sensitive data, it may be possible to use the results of one technique to improve the processing of another technique. For example, by applying the rules-based and machine learning algorithms in series (e.g., applying machine learning algorithm to the results of the rules-based algorithm, or vice-versa), the later algorithm may operate more accurately, since it can effectively build on and operate with the benefit of the results of the processing of the earlier algorithm.

Figure 2:
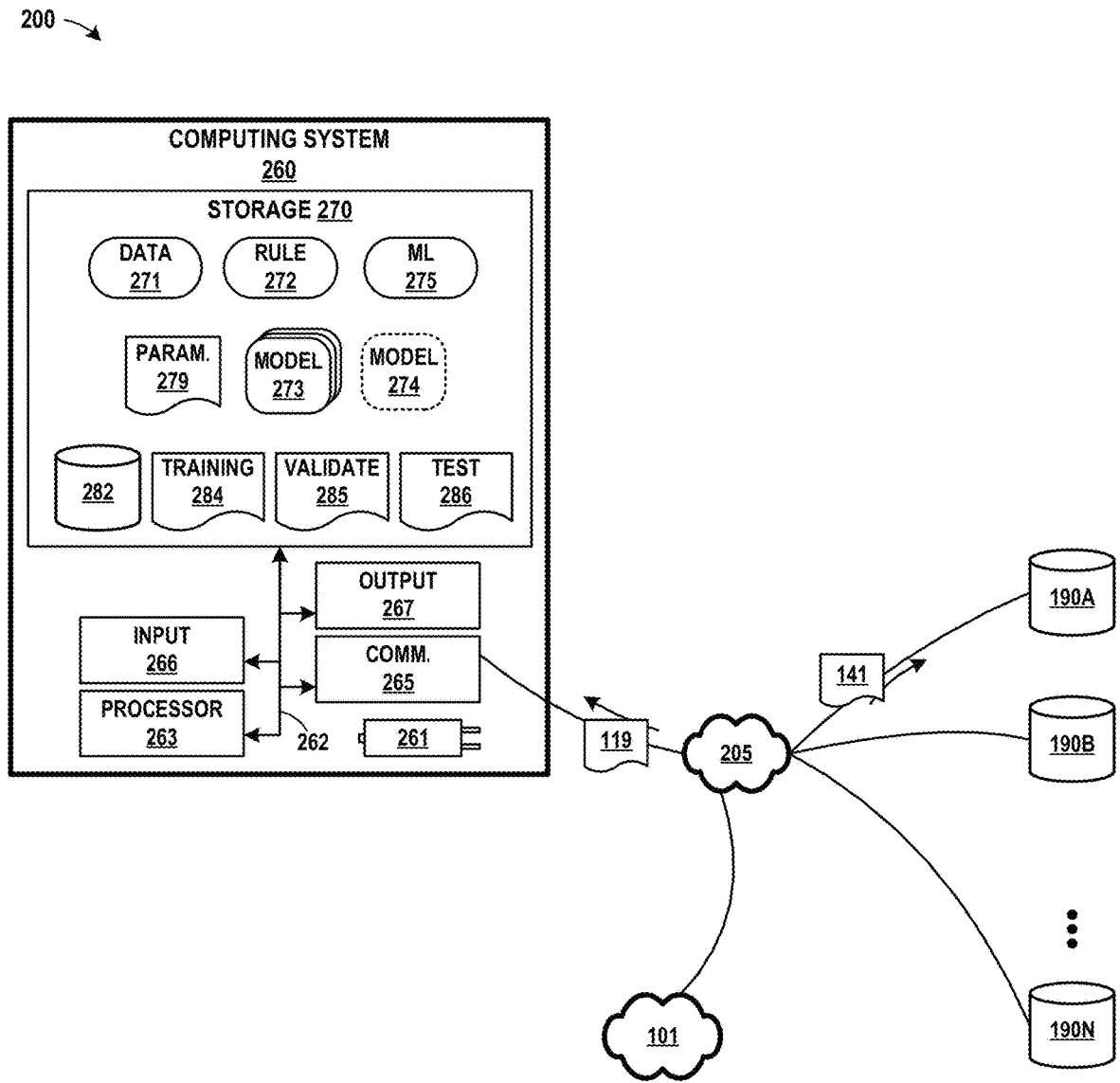
FIG. 2 is a block diagram illustrating an example computing system that processes data to remove or otherwise treat sensitive data, in accordance with one or more aspects of the present disclosure.

FIG. 2 is a block diagram illustrating an example system that processes data to remove or otherwise treat sensitive data, in accordance with one or more aspects of the present disclosure. System 200 of FIG. 2 may be described as an example or alternative implementation of system 100 of FIG. 1B. One or more aspects of FIG. 2 may correspond to systems or components described herein within the context of FIG. 1A and/or FIG. 1B. For example, network 205 may correspond to network 105 of FIG. 1A and FIG. 1B. Computing system 260 may correspond to computing system 160 of FIG. 1B. Unscrubbed transcript 119 and scrubbed transcript 141 of FIG. 2 may correspond to unscrubbed transcript 119 and scrubbed transcript 141 of FIG. 1B.

In the example of FIG. 2, system 200 includes computing system 260 connected to data repositories 190A through 190N (collectively, "data repositories 190") over network 205. Data repositories 190 may be additional examples of data repositories 190 of FIG. 1B. Computing system 260 is shown in FIG. 2 receiving one or more transcripts (e.g., unscrubbed transcript 119) over network 205 from one or more sources, which may include communications system 101 illustrated in FIG. 1A.

Computing system 260 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 260 represents a cloud computing system, server farm, and/or server cluster (or portion thereof) that provides services to client devices and other devices or systems. In other examples, computing system 260 may represent or be implemented through one or more virtualized compute instances (e.g., virtual machines, containers) of a data center, cloud computing system, server farm, and/or server cluster.

Although illustrated as a single system in FIG. 2, computing system 260 may represent multiple computing systems, and may be implemented in a distributed fashion across multiple data centers and/or geographic regions. Computing system 260 may be implemented by physical or virtualized computing devices, and may use or implement representational state transfer (REST)-based APIs for one or more services described herein.

Network 205 may be the internet or may include or represent any public or private communications network or other network. For instance, network 205 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 205 using any suitable communication techniques. Network 205 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems).

Each of the devices or systems illustrated in FIG. 2 may be operatively coupled to network 205 using one or more network links. The links coupling such devices or systems to network 205 may be Ethernet, Asynchronous Transfer Mode (ATM) or other types of network connections, and such connections may be wireless and/or wired connections. One or more of the devices or systems illustrated in FIG. 2 or otherwise on network 205 may be in a remote location relative to one or more other illustrated devices or systems.

Computing system 260 may include power source 261, one or more processors 263, one or more communication units 265, one or more input devices 266, one or more output devices 267, and one or more storage devices 270. Storage devices 270 may include data module 271, machine learning (ML) module 275, models 273, along with parameters 279. Storage devices 270 may further include data store 282, training data 284, validation data 285, and test data 286. One or more of the devices, modules, storage areas, or other components of computing system 260 may be interconnected to enable inter-component communications (physically, communicatively, and/or operatively). In some examples, such connectivity may be provided by through communication channels (e.g., communication channels 262), a system bus, a network connection, an inter-process communication data structure, or any other method for communicating data.

Power source 261 may provide power to one or more components of computing system 260. Power source 261 may receive power from the primary alternating current (AC) power supply in a building, home, or other location. In other examples, power source 261 may be a battery or a device that supplies direct current (DC). In still further examples, computing system 260 and/or power source 261 may receive power from another source. One or more of the devices or components illustrated within computing system 260 may be connected to power source 261, and/or may receive power from power source 261. Power source 261 may have intelligent power management or consumption capabilities, and such features may be controlled, accessed, or adjusted by one or more modules of computing system 260 and/or by one or more processors 263 to intelligently consume, allocate, supply, or otherwise manage power.

One or more processors 263 of computing system 260 may implement functionality and/or execute instructions associated with computing system 260 or associated with one or more modules illustrated herein and/or described below. One or more processors 263 may be, may be part of, and/or may include processing circuitry that performs operations in accordance with one or more aspects of the present disclosure. Examples of processors 263 include microprocessors, application processors, display controllers, auxiliary processors, one or more sensor hubs, and any other hardware configured to function as a processor, a processing unit, or a processing device. Computing system 260 may use one or more processors 263 to perform operations in accordance with one or more aspects of the present disclosure using software, hardware, firmware, or a mixture of hardware, software, and firmware residing in and/or executing at computing system 260.

One or more communication units 265 of computing system 260 may communicate with devices external to computing system 260 by transmitting and/or receiving data, and may operate, in some respects, as both an input device and an output device. In some examples, communication unit 265 may communicate with other devices over a network. In other examples, communication units 265 may send and/or receive radio signals on a radio network such as a cellular radio network. In other examples, communication units 265 of computing system 260 may transmit and/or receive satellite signals on a satellite network such as a Global Positioning System (GPS) network. Examples of communication units 265 include a network interface card (e.g. such as an Ethernet card), an optical transceiver, a radio frequency transceiver, a GPS receiver, or any other type of device that can send and/or receive information. Other examples of communication units 265 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 266 may represent any input devices of computing system 260 not otherwise separately described herein. One or more input devices 266 may generate, receive, and/or process input from any type of device capable of detecting input from a human or machine. For example, one or more input devices 266 may generate, receive, and/or process input in the form of electrical, physical, audio, image, and/or visual input (e.g., peripheral device, keyboard, microphone, camera). For computing devices that may be used by a user, one or more input devices 266 may generate or receive input from a keyboard, pointing device, voice responsive system, video camera, button, sensor, mobile input device, control pad, microphone, presence-sensitive screen, network, or any other type of device for detecting input from a human or machine.

One or more output devices 267 may represent any output devices of computing system 260 not otherwise separately described herein. One or more output devices 267 may generate, receive, and/or process input from any type of device capable of detecting input from a human or machine. For example, one or more output devices 267 may generate, receive, and/or process output in the form of electrical and/or physical output (e.g., peripheral device, actuator). For computing devices that may be used by a user, one or more output devices 267 may generate, present, and/or process output in the form of tactile, audio, visual, video, and other output. Some devices may serve as both input and output devices. For example, a communication device may both send and receive data to and from other systems or devices over a network.

One or more storage devices 270 within computing system 260 may store information for processing during operation of computing system 260. Storage devices 270 may store program instructions and/or data associated with one or more of the modules described in accordance with one or more aspects of this disclosure. One or more processors 263 and one or more storage devices 270 may provide an operating environment or platform for such modules, which may be implemented as software, but may in some examples include any combination of hardware, firmware, and software. One or more processors 263 may execute instructions and one or more storage devices 270 may store instructions and/or data of one or more modules. The combination of processors 263 and storage devices 270 may retrieve, store, and/or execute the instructions and/or data of one or more applications, modules, or software. Processors 263 and/or storage devices 270 may also be operably coupled to one or more other software and/or hardware components, including, but not limited to, one or more of the components of computing system 260 and/or one or more devices or systems illustrated as being connected to computing system 260.

In some examples, one or more storage devices 270 are temporary memories, meaning that a primary purpose of the one or more storage devices is not long-term storage. Storage devices 270 of computing system 260 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 270, in some examples, also include one or more computer-readable storage media. Storage devices Storage devices 270 may further be configured for long-term storage of information as non-volatile memory space and retain information after activate/off cycles. Examples of non-volatile memories include magnetic and/or spinning platter hard disks, optical discs, Flash memories, or forms of electrically programmable memories (EPROM) or electrically erasable and programmable (EEPROM) memories.

Data module 271 may perform functions relating to receiving data to process for sensitive data or receiving data used for training machine learning models. In some examples, data module 271 may receive textual information in the form of a chat transcript, and prepare such information for processing by one or more other modules included within computing system 260. In other examples, data module 271 may receive data in another form (e.g., an audio recording) and translate the data into a text (e.g., as a text transcript of the audio recording). Data module 271 may process data in preparation for use in training and evaluating machine learning modules, and may store such data within data store 282. In some examples, machine learning module 275 may split data stored within 282 into training data 284, validation data 285, and/or test data 286.

Rules-based parsing module 272 may perform functions relating to applying rule-based algorithms for identifying sensitive data, and may operate and may be implemented in a manner similar to rule-based structured data scrubbing module 172. In some examples, rules-based parsing module 272 may be used primarily or exclusively for identifying structured sensitive data within text, which may data that has a regular or predictable form, such as phone numbers, account numbers, social security numbers, and other instances of information. In some examples, rules-based parsing module 272 is implemented using a regular expression parser (i.e. a "regex" parser) that uses a sequence of characters to define a search pattern. The search pattern is applied to text to identify sequences of characters that match the search pattern. Identified sequences may be modified or removed from unscrubbed transcript 119 as part of a process to generate scrubbed transcript 141. Although rules-based parsing module 272 is described herein as being implemented using regular expression algorithms, other rule-based algorithms or techniques may be used, and rules-based parsing module 272 should be understood to encompass any rule-based algorithm or technique that applies rules to identify structured information in text.

Machine learning module 275 may perform functions relating to training and/or evaluating models 273, selecting one or more chosen models 274, and applying one or more models 273 to generate predicted labels associated with textual elements in a text transcript. Machine learning module may operate and may be implemented in a manner similar to unstructured data scrubbing module 175. Machine learning module 275 may further receive information for use in tuning one or more machine learning models, and machine learning module 275 may store such information as parameters or hyperparameters 279. Machine learning module 275 may use training data 284 to generate a plurality of models 273, and may use validation data 285 to verify and adjust the skill of each of models 273. Machine learning module 275 may use test data 286 to confirm the skill of each of models 273.

Machine learning module 275 may evaluate the skill of each of models 273 by comparing the predicted sensitive data identified by each of models 273 to the actual sensitive data associated with training data 284, validation data 285, and/or test data 286. In some examples, the actual sensitive data associated with each of training data 284, validation data 285, and/or test data 286 may be represented by a set of labels associated with each instance of training data within training data 284, validation data 285, and/or test data 286. Machine learning module 275 may choose one or more of models 273 and designate such model(s) as chosen model 274, suitable for use in identifying sensitive data for a new set of text (e.g., not included within training data 284, validation data 285, and/or test data 286). One or more chosen models 274 may correspond to optimal, preferred, and/or winning algorithms selected by machine learning module 275 as a result of a comparison of the skill of each of models 273 in identifying sensitive data, and typically, unstructured sensitive data.

Machine learning module 275 may receive information that corresponds to a request to identify sensitive unstructured data within a set of text (e.g., unscrubbed transcript 119). Machine learning module 275 may apply chosen model 274 to the text, and identify sensitive unstructured data. In some examples, machine learning module 275 may also treat unscrubbed transcript 119 to scrub, modify, or otherwise cleanse unscrubbed transcript 119 by removing, replacing, or otherwise obfuscating the identified sensitive data, thereby generating scrubbed transcript 141. Machine learning module 275 may cause communication unit 265 to output, over network 205, scrubbed transcript 141 destined for one or more of data repositories 190.

In some examples, machine learning module 275 may generate models using machine learning algorithms that are based on natural language parsing, and in particular, machine learning module 275 may employ and/or tune a probabilistic parser that makes informed predictions about the structure of messy, unstructured text. Machine learning module 275 may perform this task using Conditional Random Field ("CRF") techniques, which are based on statistical modeling methods sometimes applied in pattern recognition and machine learning and used for structured prediction. CRF techniques fall into the sequence modeling family. Whereas a discrete classifier may predict a label for a single sample without considering "neighboring" samples, a CRF model can take context into account. In some examples, this may be implemented using a linear chain CRF to predict sequences of labels for sequences of text input samples.

Models 273 may correspond to models generated by machine learning module 275 based on data stored within data store 282 (e.g. training examples) and/or training data 284. In some examples, some of models 273 may be generated using the same machine learning algorithm, but using a different set of hyperparameters 279 to alter, tune, or otherwise modify the machine learning algorithm so that multiple models 273 may result from the same type of algorithm. Further models 273 may be generated using cross-validation techniques to help ensure the integrity of models 273 and to help ensure negative effects of underfitting and overfitting training data 284 are avoided.

Parameters 279 may correspond to machine learning algorithm parameters or hyperparameters relating to constraints, weights, and/or learning rates as applied to different algorithms. Parameter values are often established prior to training a machine learning algorithm using a data set (e.g., training data 284). Parameters may be used to apply regularization techniques. Different machine learning algorithms may require different parameters or hyperparameters, although some simple algorithms (e.g., ordinary least squares regression) may require no hyperparameters. Typically, parameters are tuned so that a machine learning algorithm or model can optimally solve the machine learning problem. Parameters 279 may include information derived from information received as input from a user, machine learning practitioner, and/or from other sources.

Data store 282 may represent any suitable data structure or storage medium for storing data used to train and/or evaluate one or more models 273, or for storing temporary data generated by one or more of models 273 or chosen model 274. The information stored in data store 282 may be searchable and/or categorized such that one or more modules within computing system 260 may provide an input requesting information from data store 282, and in response to the input, receive information stored within data store 282. In some examples, data store 282 may store a large set of training data, which may include a set of chat transcripts with unstructured sensitive data (and in some cases, structured sensitive data) identified using labels or another method. Data store 282 may be primarily maintained by data module 271. Data store 282 may receive from data module 271 information from one or more data sources, and may provide other modules with access to the data stored within data store 282, and/or may analyze the data stored within data store 282 and output such information on behalf of other modules of computing system 260.

Training data 284 may represent a set of data, derived from data store 282, that is used by machine learning module 275 to train models 273. Validation data 285 represent a set of data, also derived from data store 282, that is used to evaluate and/or validate models 273. Models 273 may be trained with training data 284, and then the results of the training may be validated using validation data 285. Based on training results and/or validation, further adjustments may be made to one or more of models 273, and additional models 273 may be trained and validated using training data 284 and validation data 285, respectively. Test data 286 may be used to verify and/or confirm the results of the training process involving training data 284 and validation data 285. In some examples, each of training data 284, validation data 285, and test data 286 may labeled text transcripts, as described herein.

Modules illustrated in FIGS. 1B and 2 (e.g., unstructured data scrubbing module 172, unstructured data scrubbing module 175, data module 271, rules-based parsing module 272, and machine learning module 275) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
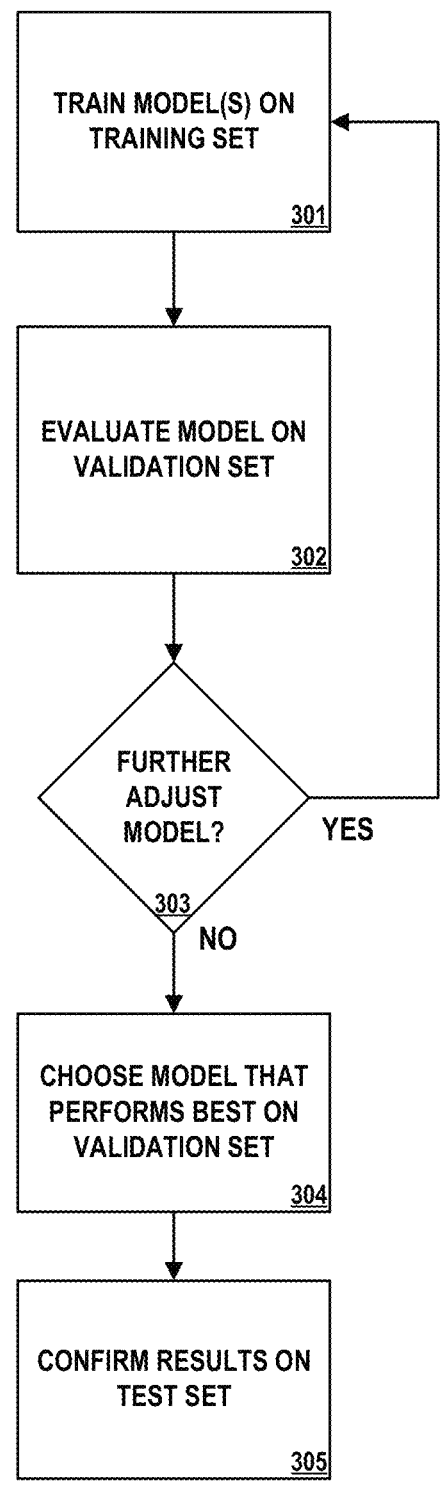
FIG. 3 is a flow diagram illustrating operations performed by an example system to train a machine learning model to identify unstructured data in a data set, in accordance with one or more aspects of the present disclosure.

FIG. 3 is a flow diagram illustrating operations performed by an example system to train a machine learning model to identify unstructured data in a data set, in a in accordance with one or more aspects of the present disclosure. FIG. 3 is described herein within the context of computing system 260 of FIG. 2. In other examples, operations described in FIG. 3 may be performed by one or more other components, modules, systems, or devices. Further, in other examples, operations described in connection with FIG. 3 may be merged, performed in a difference sequence, omitted, or may encompass additional operations not specifically illustrated or described.

In FIG. 3, and in accordance with one or more aspects of the present disclosure, a computing system may collect data that can be used to train machine learning models. For instance, in an example that can be described within the context of FIG. 2 and FIG. 3, communication unit 265 of computing system 260 detects input that data module 271 determines corresponds to a collection of text transcripts. Data module 271 further determines that the text transcripts are labeled so that each instance of unstructured sensitive data 124 is identified within the text transcripts. In some examples, the text transcripts are also labeled so that some or all instances of structured sensitive data 122 are also identified within the text transcripts. Data module 271 determines that the collection of text transcripts are suitable as use for a training set for training a machine learning model capable of identifying instances of unstructured sensitive data 124. In some examples, the training set text data that has been scrubbed for structured sensitive information, but retains the type of structured sensitive information that has been scrubbed (e.g., account numbers and other structural numerical fields are replaced with "###," phone numbers are replaced with "PPP-PPP-PPPP," email addresses are replaced with "EEE@EEE). Data module 271 stores the text transcripts and associated label information in data store 282.

Computing system 260 may train one or more a machine learning models (301). For instance, with reference to the example being described within the context of FIG. 2 and FIG. 3, data module 271 of computing system 260 generates training data 284, validation data 285, and test data 286 by splitting some or all of the available training data stored within data store 282 into three parts. Data module 271 outputs information about training data 284, validation data 285, and test data 286 to machine learning module 275. Machine learning module 275 uses training data 284 to train a plurality of models 273, which may include one or more neural networks and/or probabilistic parsers using Conditional Random Field techniques. For one or more of such algorithms, machine learning module 275 accesses parameters 279 and uses one or more of parameters 279 to tune the machine learning algorithm. Accordingly, by using various parameters 279 for a given machine learning algorithm, multiple models 273 may be generated from one machine learning algorithm. Machine learning module 275 may also train multiple use multiple different machine learning algorithms to generate additional models 273.

To train one or more of models 273, machine learning module 275 may configure the parser to the domain by configuring labels (i.e., the set of possible tags for the tokens) and a tokenizer (i.e., how a raw string will be split into a sequence of tokens to be tagged). Machine learning module 275 may define features relevant to the domain (e.g., length and casing), and define sequence-level features (e.g., whether a token is the first token in the sequence). Machine learning module 275 may further prepare the training data before training each of models 273 on training data 284. Accordingly, as a result of processing, machine learning module 272 generates a plurality of models 273, each trained by training data 284.

Computing system 260 may evaluate the trained models 273 (302). For instance, still referring to FIG. 2 and FIG. 3, machine learning module 275 accesses validation data 285 and applies models 273 to the text included within validation data 285 to identify predicted unstructured sensitive data. Machine learning module 275 compares the predicted unstructured sensitive data to the labels included within validation data 285 to evaluate the skill of each of models 273.

Computing system 260 may, in response to input, adjust the model (YES path from 303). For instance, again referring to the example being described with reference to FIG. 2 and FIG. 3, machine learning module 275 adjusts the model in response to the results of comparing the predicted unstructured sensitive data to the labels included within validation data 285. In some examples, machine learning module 275 may make such adjustments based on or in response to user or administrator input. If further adjustments are made, machine learning module 275 retrains models 273 on training data 284 and then verifies the performance of each of models 273 using validation data 285.

Computing system 260 may choose a model (304). For instance, still referring to the example being described with reference to FIG. 2 and FIG. 3, machine learning module 275 determines that no further adjustments are to be made (NO path from 303) and identifies a model that performs best on the validation set (304). Machine learning module 275 may choose the model that exhibited the best performance or skill in identifying unstructured sensitive data from training data 284 and/or validation data 285. Machine learning module 275 designates one or more of such models as chosen model 274, suitable for use in identifying unstructured sensitive data on new text transcripts no included within training data 284 or validation data 285.

Computing system 260 may confirm the accuracy of the chosen model on the test set (305). For instance, again referring to the example being described with reference to FIG. 2 and FIG. 3, machine learning module 275 accesses test data 286 and applies chosen model 274 to the text included within test data 286. Machine learning module 275 confirms that chosen model 274 exhibits performance that is sufficiently close to the performance of chosen model 274 on training data 284 and validation data 285.

Computing system 260 may apply chosen model 274 to identify unstructured sensitive data in new text. For instance, again referring to FIG. 2, communication unit 265 of computing system 260 detects input. Communication unit 265 outputs an indication of input to data module 271. Data module 271 determines that the input corresponds to unscrubbed transcript 119. Data module 271 outputs information about the input to machine learning module 275. Machine learning module 275 applies chosen model 274 to unscrubbed transcript 119. Chosen model 274 identifies unstructured sensitive data in unscrubbed transcript 119. Machine learning module 275 scrubs unscrubbed transcript 119 by modifying unscrubbed transcript 119 to remove or obscure the identified unstructured sensitive data within unscrubbed transcript 119. Data module 271 uses the modified unscrubbed transcript 119 to generate scrubbed transcript 141. Data module 271 causes communication unit 265 to output scrubbed transcript 141 over network 205, destined for one or more of data repositories 190.

Figure 4A:
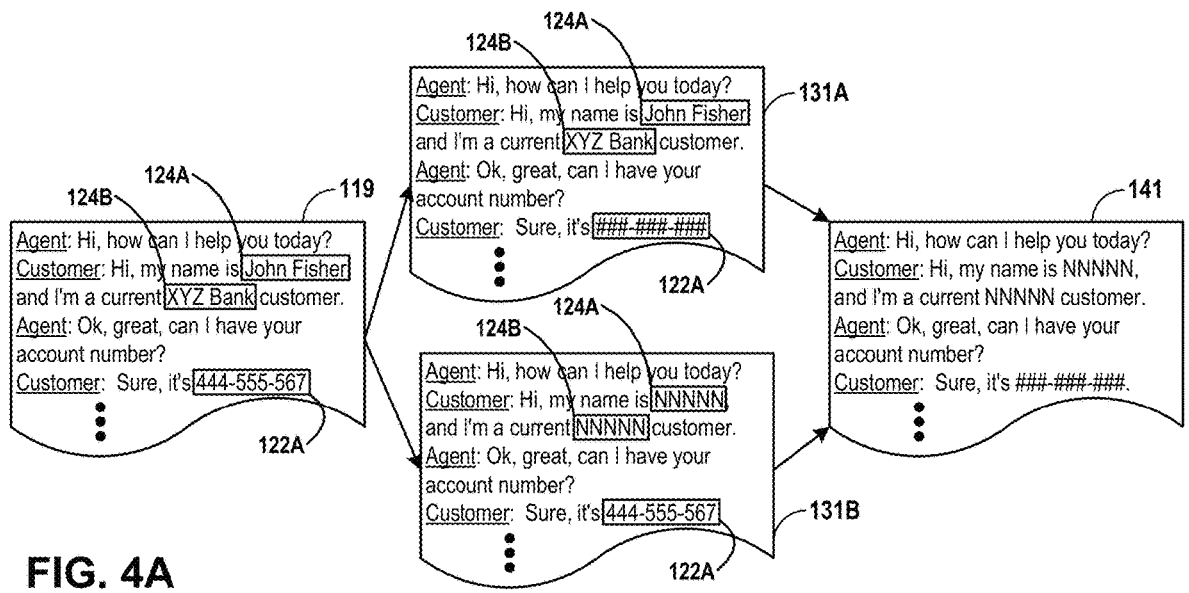
FIG. 4A, FIG. 4B, and FIG. 4C are conceptual diagrams illustrating processing of an example text transcript, in accordance with one or more aspects of the present disclosure.
Figure 4B:
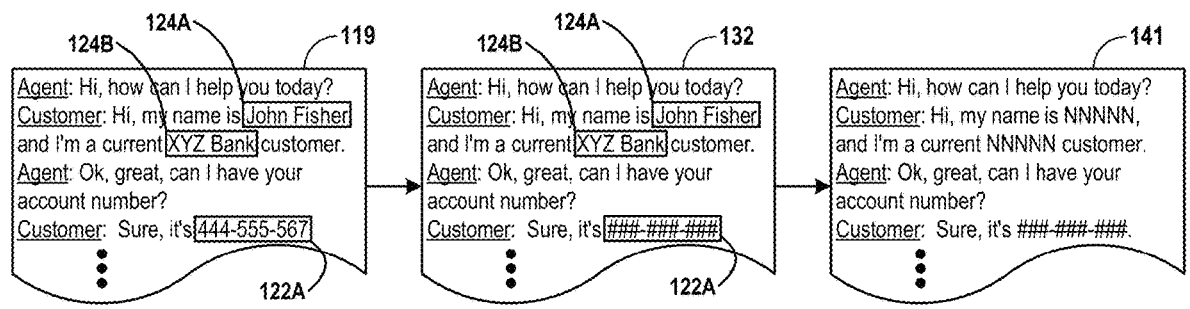
Figure 4C:
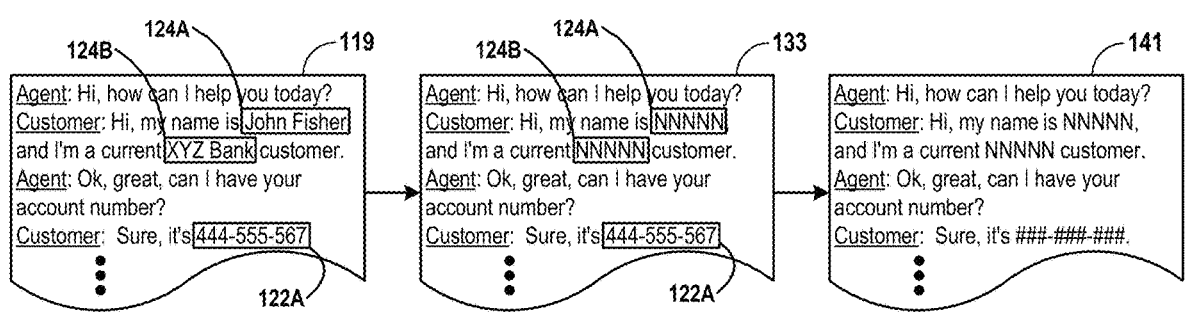

FIG. 4A, FIG. 4B, and FIG. 4C are conceptual diagrams illustrating processing of an example text transcript, in accordance with one or more aspects of the present disclosure. Each of FIG. 4A, FIG. 4B, and FIG. 4C illustrate unscrubbed transcript 119 being processed to identify instances of both structured sensitive data 122 and unstructured sensitive data 124. FIG. 4A, FIG. 4B, and FIG. 4C illustrate differences in processing based on the order in which processing is performed by a rules-based parser and by an artificially intelligent natural language parser.

FIG. 4A, for example, illustrates how a computing system may process unscrubbed transcript 119 to generate scrubbed transcript 141 by independently and/or concurrently applying a rules-based parser and an artificially intelligent natural language parser. For instance, in an example that can be described with reference to FIG. 2 and FIG. 4A, communication unit 265 of computing system 260 detects input that data module 271 determines corresponds to unscrubbed transcript 119 and a command to scrub sensitive data included within unscrubbed transcript 119. Data module 271 outputs information about unscrubbed transcript 119 to both rules-based parsing module 272 and machine learning module 275.

Rules-based parsing module 272 processes unscrubbed transcript 119 to identify instances of structured sensitive data 122. Rules-based parsing module 272 scrubs instances of structured sensitive data 122 occurring in unscrubbed transcript 119 by modifying each instance of structured sensitive data 122. Rules-based parsing module 272 generates partially-scrubbed transcript 131A. As illustrated in FIG. 4A, partially-scrubbed transcript 131A is an updated version of unscrubbed transcript 119 after instances of structured sensitive data 122 have been modified to replace sensitive data. For example, as shown in FIG. 4A, structured sensitive data 122A has been replaced with "###-###-###."

In the example of FIG. 4A, at the same time that rules-based parsing module 272 is processing unscrubbed transcript 119, as described above, machine learning module 275 processes unscrubbed transcript 119 to identify instances of unstructured sensitive data 124. For instance, continuing with the example being described with reference to FIG. 2 and FIG. 4A, machine learning module 275 applies chosen model 274 to unscrubbed transcript 119. Chosen model 274 identifies instances of unstructured sensitive data 124 occurring in unscrubbed transcript 119. Machine learning module 275 scrubs instances of unstructured sensitive data 124 occurring in unscrubbed transcript 119 by modifying each instance of unstructured sensitive data 124. Machine learning module 275 generates partially-scrubbed transcript 131B. As illustrated in FIG. 4A, partially-scrubbed transcript 131B is a new version of unscrubbed transcript 119 after instances of unstructured sensitive data 124 have been modified to replace sensitive data (e.g., "John Fisher" has been replaced with "NNNNN" and "XYZ Bank" has been replaced with "NNNNN").

Data module 271 may generate scrubbed transcript 141. For instance, completing the example being described with reference to FIG. 2 and FIG. 4A, data module 271 receives information about partially-scrubbed transcript 131A from rules-based parsing module 272 and information about partially-scrubbed transcript 131B from machine learning module 275. Data module 271 uses this information to identify and/or scrub each instance of structured sensitive data 122 and unstructured sensitive data 124 that occurs within unscrubbed transcript 119. Data module 271 generates scrubbed transcript 141, in which each instance of structured sensitive data 122 and unstructured sensitive data 124 has been modified and/or removed in the manner illustrated in FIG. 4A.

FIG. 4B illustrates processing by a rules-based parser used to identify instances of structured sensitive data 122 followed by processing by a machine learning model used identify instances of unstructured sensitive data 124. For instance, in an example that can be described with reference to FIG. 2 and FIG. 4B, computing system 260 receives unscrubbed transcript 119, and data module 271 outputs information about unscrubbed transcript 119 to rules-based parsing module 272. Rules-based parsing module 272 scrubs instances of structured sensitive data 122 occurring in unscrubbed transcript 119 by modifying each instance of structured sensitive data 122. Rules-based parsing module 272 generates partially-scrubbed transcript 132. As illustrated in FIG. 4B, partially-scrubbed transcript 132 is a modified version of unscrubbed transcript 119 after instances of structured sensitive data 122 have been modified to replace sensitive data (e.g., as shown in FIG. 4B, structured sensitive data 122A has been replaced with "###-###-###").

After rules-based parsing module 272 generates removes instances of structured sensitive data 122 from unscrubbed transcript 119 and generates partially-scrubbed transcript 132, machine learning module 275 may process partially-scrubbed transcript 132 to identify instances of unstructured sensitive data 124. For instance, still referring to FIG. 2 and FIG. 4B, machine learning module 275 applies chosen model 274 to partially-scrubbed transcript 132, which has already been scrubbed for instances of structured sensitive data 122. Chosen model 274 identifies instances of unstructured sensitive data 124 occurring in partially-scrubbed transcript 132. Machine learning module 275 scrubs instances of unstructured sensitive data 124 occurring in partially-scrubbed transcript 132 by modifying each instance of unstructured sensitive data 124. Machine learning module 275 generates scrubbed transcript 141.

In the example of FIG. 4B, machine learning module 275 applies chosen model 274 to partially-scrubbed transcript 132 rather than to unscrubbed transcript 119. Such an approach may have several advantages. For example, by enabling chosen model 274 to operate on partially-scrubbed transcript 132, where instances of structured sensitive data 122 have already been identified and removed, chosen model 274 may operate more efficiently and faster, since chosen model 274 does not have to evaluate the original text underlying each instance of structured sensitive data 122 to determine whether or not that text is an instance of unstructured sensitive data 124.

Further, by enabling chosen model 274 to operate on partially-scrubbed transcript 132 (rather than unscrubbed transcript 119) chosen model 274 may more accurately identify instances of unstructured sensitive data 124. In some examples, chosen model 274 may be trained to ignore scrubbed instances of structured sensitive data 122 that occur within partially-scrubbed transcript 132, which may improve the accuracy of chosen model 274 in ignoring instances of structured sensitive data 122. In other words, chosen model 274 may be trained to disregard text that has already been labeled or marked as scrubbed data.

Also, chosen model 274 may be trained to use information about where instances of structured sensitive data 122 occur in partially-scrubbed transcript 132 when identifying instances of unstructured sensitive data 124. For example, some instances of structured sensitive data 122 may tend to occur near instances of unstructured sensitive data 124. In some cases, for example, a telephone number (i.e., an instance of structured sensitive data 122) may tend to occur within a chat transcript near a street address (i.e., an instance of unstructured sensitive data 124). Therefore, machine learning module 275 may more accurately identify street addresses within partially-scrubbed transcript 132 if telephone numbers have already been identified and labeled within partially-scrubbed transcript 132 when machine learning module 275 processes partially-scrubbed transcript 132. Accordingly, by applying chosen model 274 to the results of rules-based parsing module 272, computing system 260 may more efficiently, quickly, and accurately remove both instances of structured sensitive data 122 and unstructured sensitive data 124 from unstructured sensitive data 124.

FIG. 4C illustrates processing by a machine learning model used identify instances of unstructured sensitive data 124 followed by a rules-based parser used to identify instances of structured sensitive data 122. FIG. 4C illustrates the reverse of the processing order described in connection with FIG. 4B. In FIG. 4C, machine learning module 275 first applies chosen model 274 to unscrubbed transcript 119 to generate partially-scrubbed transcript 133. Rules-based parsing module 272 then processes partially-scrubbed transcript 133 to generate scrubbed transcript 141. Processing unscrubbed transcript 119 by first applying chosen model 274 and then rules-based parsing module 272 to generate scrubbed transcript 141 may have certain technical and efficiency advantages similar to those described in connection with FIG. 4B.

Figure 5:
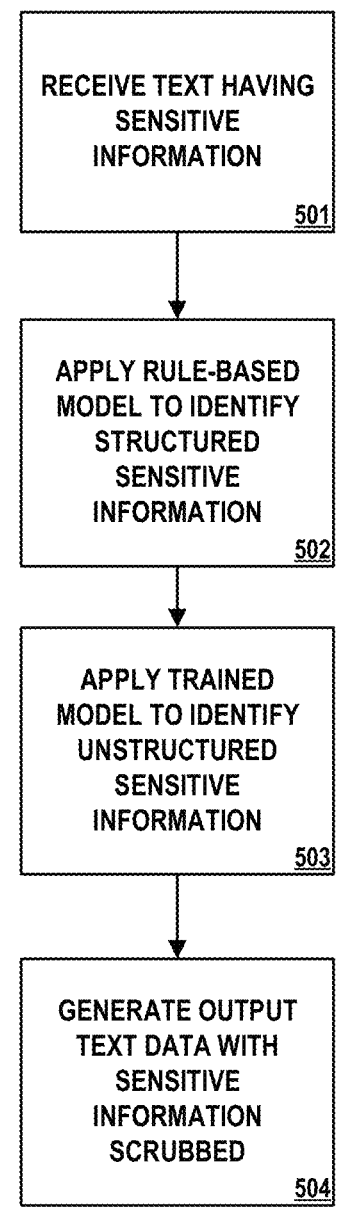
FIG. 5 is a flow diagram illustrating operations performed by an example computing system in accordance with one or more aspects of the present disclosure.

FIG. 5 is a flow diagram illustrating operations performed by an example computing system in accordance with one or more aspects of the present disclosure. FIG. 5 is described below within the context of computing system 260 of FIG. 2. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In FIG. 5, and in accordance with one or more aspects of the present disclosure, computing system 260 may receive text data having sensitive information (501). For example, communication unit 265 of computing system 260 may detect input that data module 271 determines corresponds to unscrubbed transcript 119.

Computing system 260 may apply a rule-based model to identify structured sensitive information in the text data (502). For example, rules-based parsing module 272 of computing system 260 may apply a regular expression (i.e., "regex") parser to scrub instances of structured sensitive data 122 occurring in unscrubbed transcript 119. To scrub each instance of structured sensitive data 122, rules-based parsing module 272 may replace each instance of structured sensitive data 122 with non-sensitive data. In some examples, computing system 260 may implement or access rules-based parsing module 272 through a REST API.

Computing system 260 may apply a machine learning model to identify unstructured sensitive information in the text data (503). For example, machine learning module 275 of computing system 260 may apply a trained machine learning model (e.g., chosen model 274) to scrub instances of unstructured sensitive data 124 occurring in unscrubbed transcript 119. Rules-based parsing module 272 may replace each identified instance of unstructured sensitive data 124 with non-sensitive data. In some examples, machine learning module 275 may apply chosen model 274 to unscrubbed transcript 119 or, in other examples, to a version of transcript 119 after processing by rules-based parsing module 272. Computing system 260 may also implement or access machine learning module 275 and/or chosen model 274 through a REST API.

Computing system 260 may generate output text data from the text data (504). For example, computing system 260 may use the results of processing by rules-based parsing module 272 and by machine learning module 275 to construct scrubbed transcript 141.

In accordance with one or more aspects of this disclosure, one or more computing systems may analyze information derived from interactions with a user of a computing system. It may be appropriate for such a computing system to analyze such information only after receiving permission from the user. For example, in some examples described herein, before a computing system can collect or make use of information associated with a user, the user may be provided with an opportunity to control whether the computing system can collect or make use of information about the user (e.g., information about the input detected by a computing system, such as chat transcripts, audio, images, or geolocation information detected by the computing system), or to dictate whether and/or how the computing system can use such information. In some examples, and as described herein, certain data may be modified so that personally-identifiable information is removed. In other examples, a user's geographic location may be generalized where location information is obtained (such as to a city, ZIP code, or state level), so that a location of a user cannot be determined.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., computing system 160, computing system 260, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1A, FIG. 1B, FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    training, by a computing system, a machine learning model to identify unstructured sensitive information in text that has already been scrubbed for structured sensitive information, each instance of structured sensitive information including both a value and a type,
    wherein training the machine learning includes training the machine learning model using text data that has already been scrubbed for structured sensitive information, but that retains the type of structured sensitive information, and
    wherein training the machine learning model includes tuning the machine learning model, during training, to use information about where the structured sensitive information occurs within the text data to identify instances of unstructured sensitive information;
    receiving, by the computing system, text data containing sensitive information, including structured sensitive information and unstructured sensitive information;
    applying, by the computing system, a rule-based model to identify the structured sensitive information in the text data;
    generating, by the computing system, results from the rule-based model by modifying the structured sensitive information to hide the value of the structured sensitive information but retain the type of the structured sensitive information;
    applying, by the computing system, the machine learning model to identify the unstructured sensitive information in the text data by applying the machine learning model to the results from the rule-based model;
    generating, by the computing system, output text data from the results from the rule-based model by modifying the unstructured sensitive information identified by the machine learning model;
    performing, by the computing system and using the output text data, analytical studies about customer requests; and
    training a chat bot using the output text data.

2. The method of claim 1, further comprising:
    publishing the output text data for use in analytical studies about organizational operations.

3. The method of claim 1,
    wherein the sensitive information includes at least one of personally identifiable information and payment card industry information.

4. The method of claim 1,
    wherein the rule-based model is a regular expression model configured to identify social security numbers and phone numbers.

5. The method of claim 1,
    wherein the machine learning model is a neural network configured to identify names and addresses.

6. The method of claim 1,
    wherein the machine learning model is a neural network probabilistic parser configured to identify names and addresses using Conditional Random Field methods.

7. The method of claim 1,
    wherein the machine learning model is neural network trained using text transcripts having labeled unstructured sensitive information.

8. A computing system having a storage system and processing circuitry, wherein the processing circuitry has access to the storage system and is configured to perform operations comprising:
    training a machine learning model to identify unstructured sensitive information in text that has already been scrubbed for structured sensitive information, each instance of structured sensitive information including both a value and a type,
    wherein training the machine learning includes training the machine learning model using text data that has already been scrubbed for structured sensitive information, but that retains the type of structured sensitive information, and
    wherein training the machine learning model includes tuning the machine learning model, during training, to use information about where the structured sensitive information occurs within the text data to identify instances of unstructured sensitive information;
    receiving text data containing sensitive information, including structured sensitive information and unstructured sensitive information;
    applying a rule-based model to identify the structured sensitive information in the text data;
    generating results from the rule-based model by modifying the structured sensitive information to hide the value of the structured sensitive information but retain the type of the structured sensitive information;
    applying a machine learning model to identify the unstructured sensitive information in the text data by applying the machine learning model to the results from the rule-based model; and
    generating output text data from the text data by modifying the structured sensitive information identified by the rule-based model and the unstructured sensitive information identified by the machine learning model;
    performing, by the computing system and using the output text data, analytical studies about customer requests; and
    training a chat bot using the output text data.

9. The computing system of claim 8, wherein the processing circuitry is further configured to perform operations comprising:
    publishing the output text data for use in analytical studies about organizational operations.

10. A non-transitory computer-readable medium comprising instructions for causing processing circuitry to perform operations comprising:
    training a machine learning model to identify unstructured sensitive information in text that has already been scrubbed for structured sensitive information, each instance of structured sensitive information including both a value and a type,
    wherein training the machine learning includes training the machine learning model using text data that has already been scrubbed for structured sensitive information, but that retains the type of structured sensitive information, and wherein training the machine learning model includes tuning the machine learning model, during training, to use information about where the structured sensitive information occurs within the text data to identify instances of unstructured sensitive information;

receiving text data containing sensitive information, including structured sensitive information and unstructured sensitive information;

applying a rule-based model to identify the structured sensitive information in the text data;

generating results from the rule-based model by modifying the structured sensitive information to hide the value of the structured sensitive information but retain the type of the structured sensitive information;

applying a machine learning model to identify the unstructured sensitive information in the text data by applying the machine learning model to the results from the rule-based model;

generating output text data from the text data by modifying the structured sensitive information identified by the rule-based model and the unstructured sensitive information identified by the machine learning model;

performing, by the computing system and using the output text data, analytical studies about customer requests; and training a chat bot using the output text data.

\* \* \* \* \*